US006502510B1

(12) United States Patent
Breiholdt

(10) Patent No.: US 6,502,510 B1
(45) Date of Patent: Jan. 7, 2003

(54) METHOD FOR SEAMLESS ENGRAVING OF PATTERNS

(75) Inventor: Jan Breiholdt, Altwittenbek (DE)

(73) Assignee: Heidelberger Druckmaschinen Aktiengesellschaft, Heidelberg (DE)

( * ) Notice: Subject to any disclaimer, the term of this patent is extended or adjusted under 35 U.S.C. 154(b) by 24 days.

(21) Appl. No.: 09/677,355

(22) Filed: Oct. 2, 2000

(30) Foreign Application Priority Data

Oct. 1, 1999 (DE) ........................................ 199 47 397

(51) Int. Cl.[7] ............................ H04N 1/21; H04N 1/40; B41C 1/02

(52) U.S. Cl. ..................... 101/401.1; 358/299; 101/483

(58) Field of Search ............................ 101/401, 1, 211, 101/483, 32, 34; 358/299

(56) References Cited

U.S. PATENT DOCUMENTS 4,003,311 A * 1/1977 Bardin .................... 101/401.1
4,688,101 A * 8/1987 Doelves et al. ............. 358/299
5,519,502 A * 5/1996 Beckett ...................... 358/299
5,663,803 A * 9/1997 Beckett et al. .............. 358/299
5,691,818 A * 11/1997 Newell et al. .............. 358/299
5,706,100 A * 1/1998 Seitz et al. ................. 358/299
5,734,741 A * 3/1998 Kurata et al. ............... 382/141
5,810,396 A 9/1998 Kurata et al.
5,886,792 A * 3/1999 Beckett et al. .............. 358/299
5,892,589 A * 4/1999 Beckett et al. .............. 358/299
5,894,354 A * 4/1999 Beckett et al. .............. 358/299
5,947,020 A * 9/1999 Bornhorst et al. ............ 101/32
6,025,921 A * 2/2000 Beckett et al. .............. 358/299
6,347,891 B1 * 2/2002 Muckerheide et al. ...... 358/299

* cited by examiner

*Primary Examiner*—Eugene H. Eickholt
(74) *Attorney, Agent, or Firm*—Schiff Hardin & Waite

(57) ABSTRACT

In a method for seamless engraving of a pattern in an electronic engraving machine, an engraving element engraves a sequence of cups into a rotating engraving cylinder. For planar engraving of the pattern, the engraving element executes an axial feed motion along the printing cylinder. The pattern is seamlessly engraved such that the seam at which the upper edge and lower edge of the pattern meet at the circumference of the printing cylinder is as invisible as possible. For evaluating the engraved seam, a color proof of at least one separation color of the pattern is produced from the engraving data in a proofing unit, the engraved pattern in the color proof being offset in a circumferential direction of the printing cylinder such that the seam lies within the visible area of the color proof. The color proof is printed with a color printer or is displayed on a color monitor. For that purpose, the separation colors of the pattern are converted into printer colors or monitor colors in a color converter.

17 Claims, 3 Drawing Sheets

METHOD FOR SEAMLESS ENGRAVING OF PATTERNS

BACKGROUND OF THE INVENTION

The invention is in the field of electronic reproduction technology and is directed to a method for seamless engraving of patterns with an electronic engraving machine, a proofing unit for a seamlessly engraved pattern and an electronic engraving machine having such a proofing unit.

In an electronic engraving machine, an engraving element with an engraving stylus as a cutting tool moves in an axial direction along a rotating printing cylinder. The engraving stylus controlled by an engraving control signal cuts a sequence of cups arranged in an engraving raster into the generated surface of the printing cylinder. The engraving control signal is generated by superimposition of image signal values that represent the gradations between "light" and "dark" to be engraved and a periodic raster signal for producing the engraving raster.

In four-color printing, a color set of four printing cylinders is engraved for the inks "cyan", "magenta", "yellow" and "black"; in packaging and decorative printing, a color set often comprises additional printing cylinders for special colors.

In practice, checking the engraved printing cylinders of a color set with respect to engraving quality and cylinder layout occurs with the assistance of a proofing device, for example in the form of a color monitor on which a color proof (soft proof) is displayed, or in the form of a color printer with which a color proof (hard proof) is printed on a sheet.

In decorative or packaging printing, an endless pattern, for example in the form of a wood grain, is often printed. In this case, the printing cylinder of the color set is engraved with a seamless pattern in the electronic engraving machine, said pattern repeating without a stop on the print medium during printing after a respective revolution of the printing cylinder in the printing press. A pattern has been seamlessly engraved when the seam at the start and end of the pattern meet at the circumference of the printing cylinder is invisible to the human eye.

Traditional proofing devices are not configured for evaluating the seam of an engraved pattern, since only the development of the engraved pattern with an upper edge and lower edge but not with the seam of interest is respectively displayed on the color monitor or printed on the printed sheet.

SUMMARY OF THE INVENTION

It is therefore an object of the present invention to improve a method for the seamless engraving of a pattern with an electronic engraving machine, a proofing unit for a seamlessly engraved pattern and an electronic engraving machine having such a proofing unit such that, in particular, the quality of the seam of an engraved pattern can be evaluated.

According to the present invention, a method and apparatus is provided for seamless engraving of a pattern in an electronic engraving machine. With an engraving element connected to an engraving control signal, a sequence of cups are engraved into a rotating printing cylinder and arranged in an engraving pattern. The engraving occurs line-by-line. The engraving control signal is generated from engraving data that represent gradations of the pattern to be engraved and from a periodic raster signal for generating the engraving raster. For planar engraving of the pattern, the engraving element executes an axial feed motion along the printing cylinder. The pattern is engraved such that a seam at which an upper edge and a lower edge of the pattern meet at a circumference of the printing cylinder is as invisible as possible. For evaluating the seam of the engraved pattern, a color proof of at least one separation color of the pattern is produced from the engraving data in that the engraved pattern is offset in the circumferential direction of the printing cylinder so that the seam lies within a visible area of the color proof.

DESCRIPTION OF THE PREFERRED EMBODIMENTS

Figure 1:
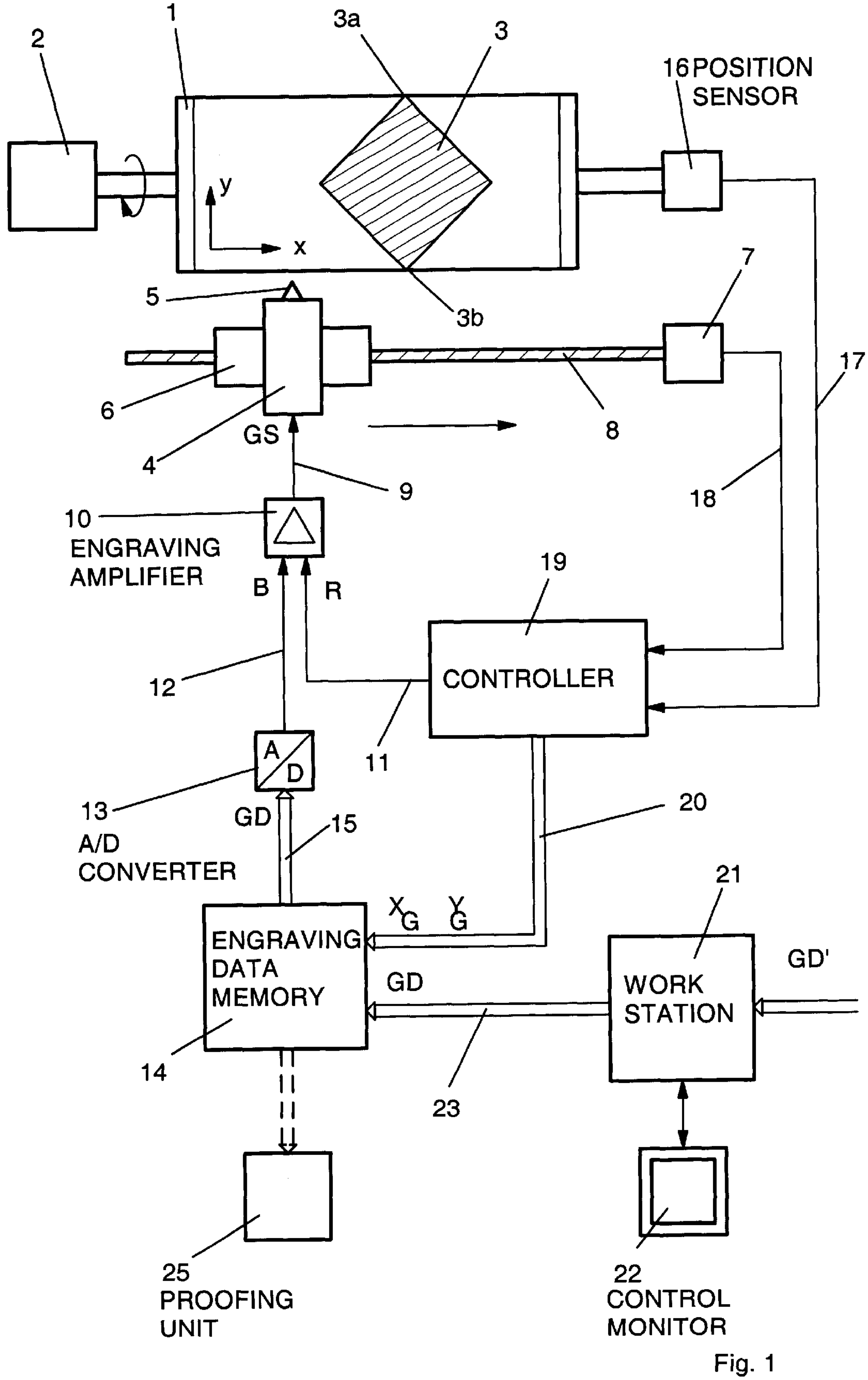
FIG. 1 is a schematic block circuit diagram of an electronic engraving machine for printing cylinders.

FIG. 1 shows a schematic block circuit diagram of an electronic engraving machine having a printing cylinder 1 that is rotationally driven by a cylinder drive 2. For example, the engraving machine is a HelioKlischograph ® of Hell Gravure Systems GmbH, Kiel, DE.

A pattern 3 is to be seamlessly engraved on the printing cylinder 1 such that the circumferential length of the pattern exactly corresponds to the circumference of the printing cylinder 1 and such that the seam at which the upper edge 3*a* and lower edge 3*b* of the pattern 3 meet is as invisible as possible. In the illustrated example, the pattern 3 is composed of a single repeating pattern as a smallest basic pattern that repeats. The pattern 3 can already be composed of a plurality of identical register rounds already lying successively at the circumference.

The engraving on the printing cylinder 1 occurs with an engraving element 4 that, for example, is designed as an electromagnetic engraving element with an engraving stylus 5 as cutting tool and that is mounted on an engraving carriage 6.

The engraving styli 5 of the engraving element 5 cut a sequence of cups arranged in an engraving raster into the generated surface of the rotating printing cylinder 1 engraving line by engraving line while the engraving carriage 6 with the engraving element 5 is moved axially along the rotating, printing cylinder 1 with a spindle 8 driven by an engraving carriage drive 7 for the planar engraving of the pattern 3.

The lifting motion of the engraving stylus 5 of the engraving element 4 is controlled by an engraving control signal GS on a line 9. The engraving control signal GS arises in an engraving amplifier 10 from the superimposition of a periodic raster signal R for generating the engraving raster on a line (11 with image signal values B on a line 12 that define the gradations of the cups to be engraved between "light" and "dark".

The analog image signal values B are acquired in an A/D converter 13 from engraving data GD that are deposited in an engraving data memory 14. When all engraving data GD belonging to the color set of a pattern 3 to be engraved are deposited in the engraving data memory 14, i.e. the engraving data $GD_C$, $GD_M$, $GD_Y$ and $GD_K$ for the color separations "yellow", "magenta", "cyan" and "black", as well as additional engraving data $GD_S$ for the color separations of special colors of the pattern 3. The engraving data GD are selected according to the color separation to be respectively engraved, are read out from the engraving data memory 14 engraving line by engraving line via a data bus 15 and are supplied to the A/D converter 13. The engraving locations for the cups prescribed by the engraving raster are defined by location coordinates x, y of a XY-coordinate system allocated to the printing cylinder 1 whose Y-axis is oriented in the circumferential direction and whose X-axis is oriented in the axial direction of the printing cylinder 1. A position sensor 16 mechanically coupled to the printing cylinder 1 generates the location coordinates y and the engraving carriage drive 7 generates the corresponding location coordinates x that are supplied to a controller 19 via lines 17, 18.

The addresses $x_G$, $y_G$ for addressing the engraving data memory 14 are generated from the location coordinates x, y in the control 19, these addresses being supplied via an address bus 20 to the engraving data memory 14. The raster signal R on the line 11 and control signals for controlling the engraving sequence are also acquired in the controller 19.

The cylinder layout for the seamless pattern 3 is designed by an operator off-line in a work station 21 by manually positioning pattern elements with a cursor or by inputting position coordinates under visual control at a control monitor 22. Potentially the circumferential length of the pattern 3 to be engraved can be exactly matched by an electronic scale modification to the circumference of the respective printing cylinder 1. Subsequently, the engraving data GD required for engraving the seamless pattern 3 are compiled in the work station 21 on the basis of the designed cylinder layout, being compiled engraving line by engraving line from engraving data GD' input into the workstation 21 and are transferred via a data bus 23 into the engraving data memory 14. For designing the cylinder layout and for the data-oriented structuring of the pattern 3 on the basis of the cylinder layout, for example, the workstation HelioCom™ of Hell Gravure Systems GmbH, Kiel DE can be employed.

Figure 2:
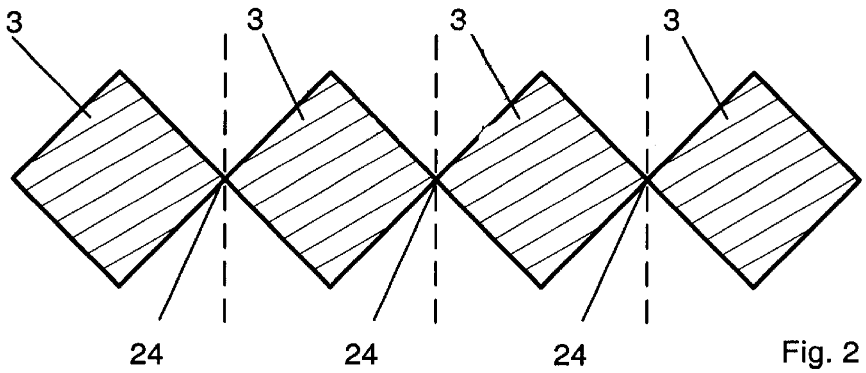
FIG. 2 is a graphic illustration of a printed endless pattern.

After the engraving, the engraved printing cylinders 1 of a color set are chucked into a printing press in order to print an endless pattern. For explanation, FIG. 2 shows the printed endless pattern that is composed of a plurality of repeating, identical, engraved patterns 3, whereby the seam 24 between the engraved patterns 3 is indicated with broken lines.

Before printing the endless pattern, however, the quality of the seam 24 in the pattern 3 seamlessly engraved on the printing cylinder 1 must be checked. A proofing unit 25 is provided for this purpose, this being a component part of the engraving machine or preferably a separate unit.

Figure 3:
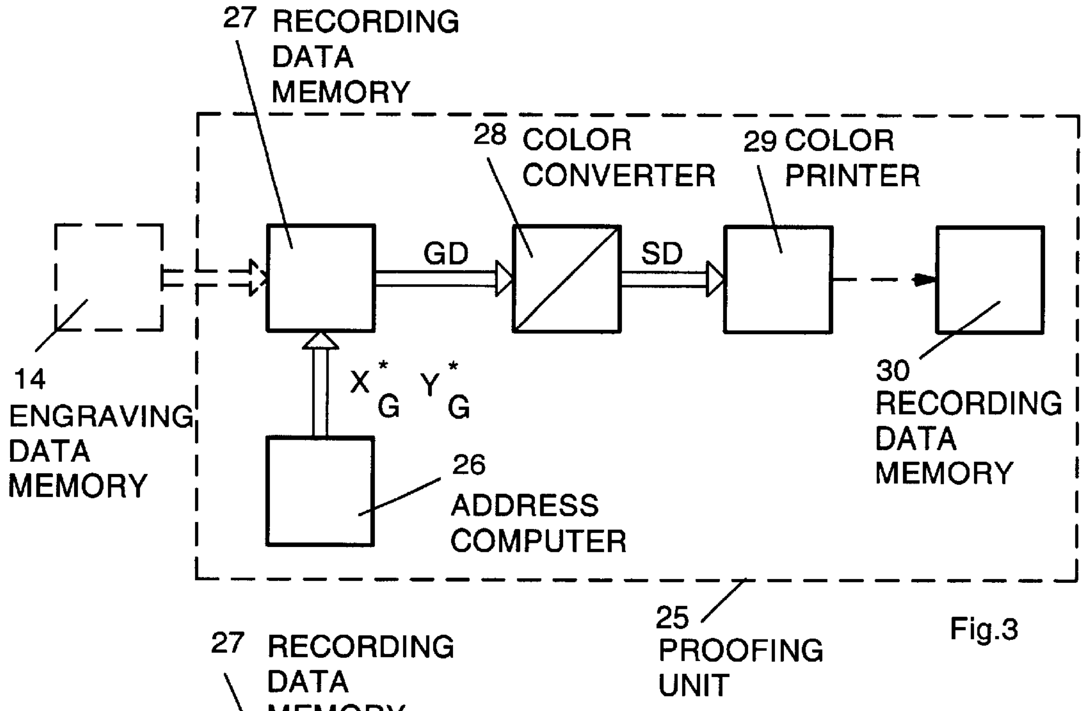
FIG. 3 shows a first exemplary embodiment of a proofing unit.

FIG. 3 shows a first exemplary embodiment of a separate proofing unit 25. The proofing unit 25 is composed of an address computer 26, of a recording data memory 27, of a color converter 28 and of a color printer 29 for printing a color proof (hard proof). The color printer 29, for example, is an ink jet printer of the Designjet™ model series of Hewlett Packard that works with the printer colors "cyan", "magenta", "yellow" and "black".

For printing the color proof, the engraving data of the four printing inks $GD_Y$, $GD_M$, $GD_C$, $GD_B$ and the engraving data $GD_S$ of the special colors of the color set of the pattern 3 are read out from the engraving data memory 14 of the engraving machine and are loaded into the recording data memory 27 of the separate proofing unit 25. When the proofing unit 25 is a component part of the engraving machine, the separate recording data memory 27 can be omitted.

The address computer 26 transforms the entire address area $x_G$, $y_G$ of the engraving data memory 15 into new addresses $x^*_G$, $y^*_G$ for the recording data memory 30 in such a way that the new addresses $Y^*_G$ differ from the old addresses ($y_G$) by an adjustable address offset ($\Delta y$) in the Y-direction (circumferential direction).

The engraving data $GD_Y$, $GD_M$, $GD_C$, $GD_B$ and $GD_S$ read out line-by-line with the new addresses ($x^*_G$, $y^*_G$) from the recording data memory 27 are converted in the color converter 28 into control signals for the color printer 29. The engraving data $GD_S$ of the special colors are thereby converted into control data SG such that the special colors are simulated in color-conforming fashion by the existing printer colors "cyan", "magenta", "yellow" and "black" of the color printer 29. The color printer 29 charged with the control data SD then prints out the desired color proof of the seamlessly engraved pattern 3 on a print sheet 30.

As a result of the address offset $\Delta Y$, the engraving data GD are read out offset from the recording data memory 27 in conformity with the invention and, thus, the color proof of the engraved pattern 3 is printed offset in the circumferential direction of the printing cylinder 1 on the printing page 30. Thus the seam 24 lies at an arbitrary location, preferably circumferentially in the middle, of the printing page 30 and does not lie at the upper or lower page edge. As a result, the seam 24 can be especially advantageously visually evaluated.

The address transformation in the address computer 26 thereby occurs according to the equations:

$$x^*_G = a\, x_G$$

$$y^*_G = b[(y_G - \Delta y) \bmod y_{GE}]$$

with:

a, b=scaling factors $y_{GE}$=final address $\Delta y$=adjustable address offset Instead of a color proof of all separation colors, a color proof that contains only at least one separation color and/or a special color can also be produced by selecting the corresponding engraving data (GD) of a color set.

Figure 4:
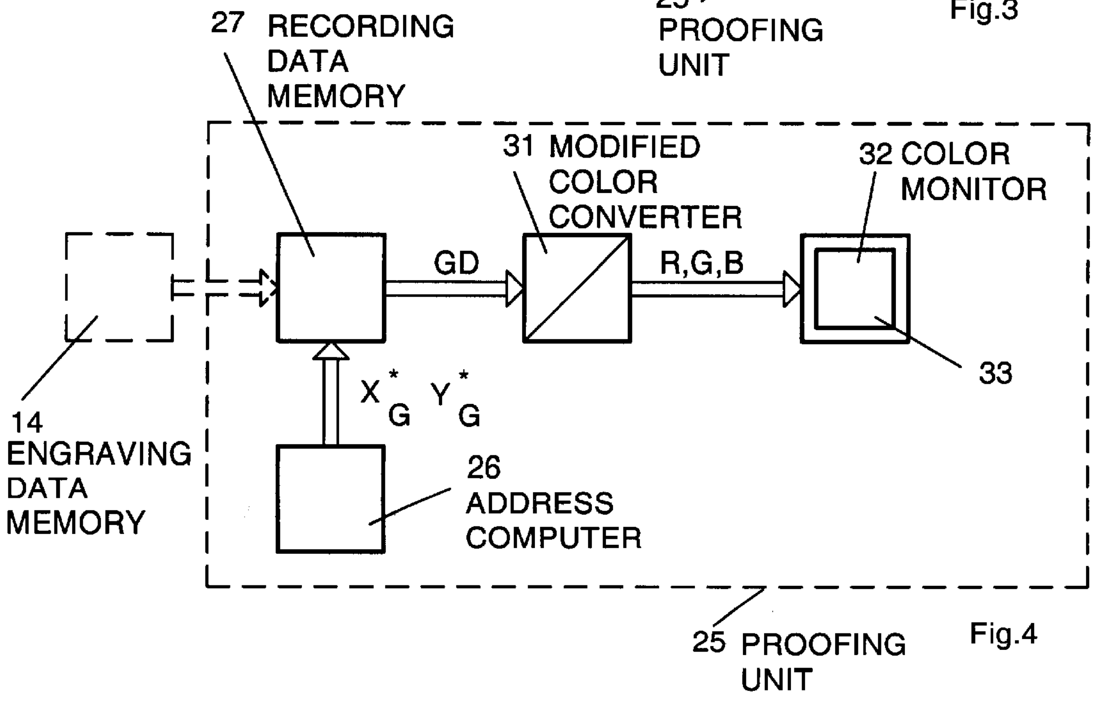
FIG. 4 shows a second exemplary embodiment of a proofing unit.

FIG. 4 shows a second exemplary embodiment of a separate proofing unit 25 that is composed of the address computer 26, the recording data memory 27, a modified color converter 31 and a color monitor 32 for displaying a color proof (soft proof).

For displaying the color proof, the engraving data of the four inks $GD_y$, $GD_M$, $GD_C$, $GD_B$ and the engraving data $GD_S$ of the special colors of the color set of the engraved pattern 3 are again read out from the engraving data memory 14 of the engraving machine and are loaded into the recording data memory 27 of the separate proofing unit 25.

The address computer 26 works in the way described in FIG. 3. The engraving data $GD_Y$, $GD_M$, $GD_C$, $GD_B$, and $GD_S$, read out line-by-line from the recording data memory 27 with the new addresses ($x^*_G$, $y^*_G$) are converted in the color converter 31 into the drive signals (R, G, B) required for a color-compatible presentation, these being supplied to the internal image repetition memory of the color monitor 32.

Given this proofing unit, the engraving data GD are read out according to the invention in an offset manner from the recording data memory 27 and, thus, the color proof of the engraved pattern 3 is displayed offset as monitor picture 33 on the color monitor 32 in circumferential direction of the printing cylinder 1. Thus, the seam 24 to be evaluated preferably lies circumferentially in the middle of the monitor picture 33 and not at the upper or lower picture edge.

Figure 5:
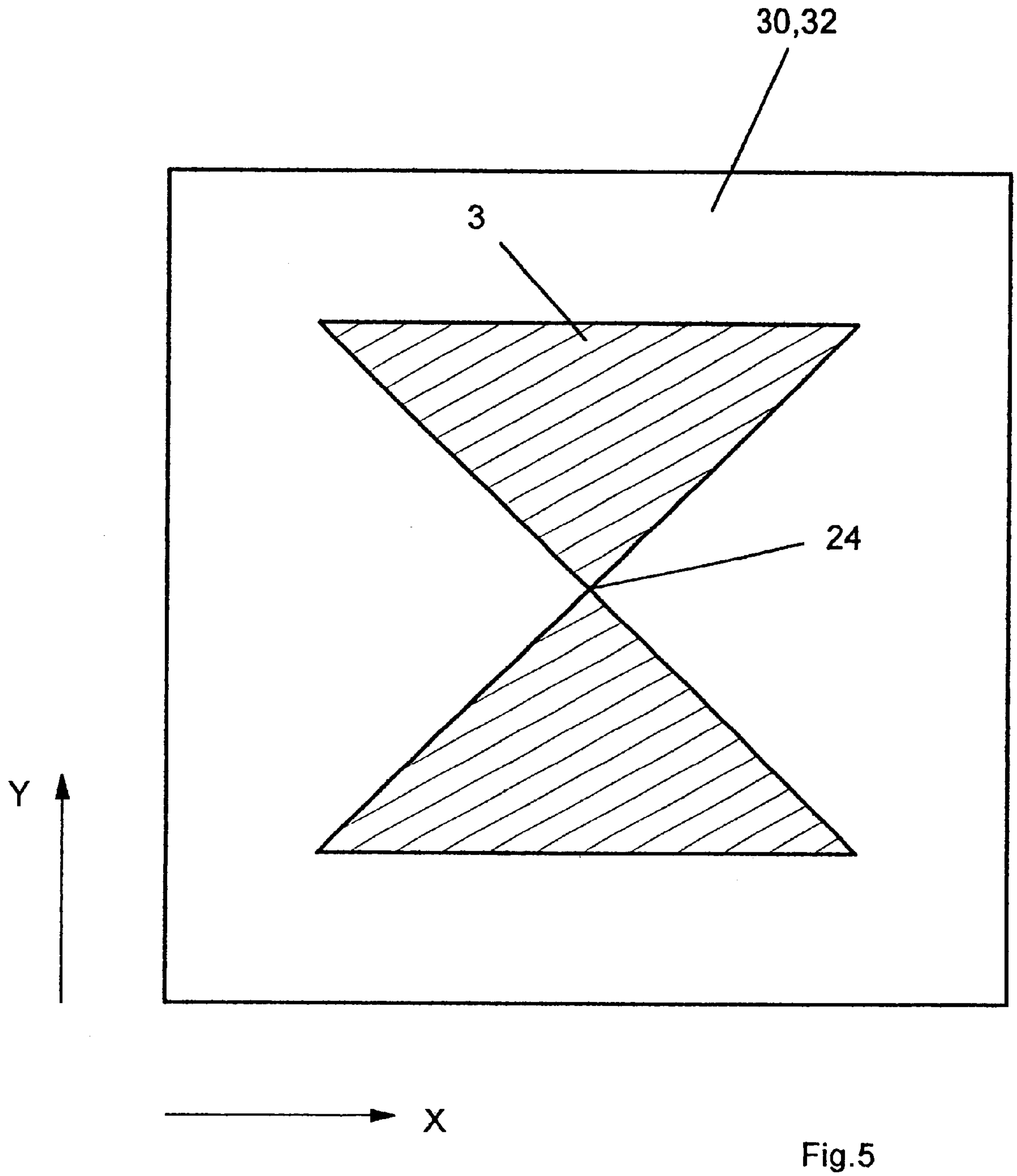
FIG. 5 illustrates a magnified illustration of a printed page or of a monitor picture with a seamlessly engraved pattern.

In a magnified illustration, FIG. 5 shows the printing page 30 or the monitor picture 33 on which the engraved pattern 3 is registered by the inventive technique so that the seam 24 of the pattern 3 preferably lies in the middle of the printing page 30 or of the monitor picture 33.

Although various minor modifications might be suggested by those skilled in the art, it should be understood that our wish to embody within the scope of the patent warranted hereon all such modifications as reasonably and properly come with the scope of our contribution to the art.

I claim as my invention:

1. A method for seamless engraving of a pattern in an electronic engraving machine, comprising the steps of:

with an engraving element connected to an engraving control signal, engraving a sequence of cups arranged in an engraving pattern into a rotating printing cylinder engraving line by engraving line;

generating the engraving control signal from engraving data that represent gradations of the pattern to be engraved and from a periodic raster signal for generating an engraving raster;

for planar engraving of the pattern with the engraving element, executing an axial feed motion along the printing cylinder;

engraving the pattern such that a seam at which an upper edge and a lower edge of the pattern meet at a circumference of the printing cylinder is as invisible as possible; and for evaluating the seam of the engraved pattern, producing a color proof of at least one separation color of the pattern from the engraving data in that the engraved pattern is offset in a circumferential direction of the printing cylinder so that the seam lies within a visible area of the color proof.

2. The method according to claim 1 wherein the color proof is printed with a color printer.

3. The method according to claim 1 wherein the color proof is displayed on a color monitor.

4. The method according to claim 1 wherein the engraving data of the pattern are stored to be read out with addresses;

a circumferential address offset is defined that corresponds to a desired circumferential position of the seam in the visible area of the color proof;

new addresses are calculated from the addresses taking an address offset into consideration;

the engraving data are read out with the new addresses;

the engraving data that are read out are converted into control data for the available printer colors of the color printer; and the color printer is charged with the control data for printing the color proof.

5. The method according to claim 1 wherein the engraving data of the pattern are stored to be read out with addresses;

a circumferential address offset is defined that corresponds to the desired circumferential position of the seam in the visible area of the color proof;

new addresses are calculated from the addresses taking the address offset into consideration;

the engraving data are read out with the new addresses;

the engraving data that are read out are converted into RGB signals for the color monitor; and the color monitor is charged with the RGB control signals for presenting the color proof.

6. The method according to claim 1 wherein the engraving data represent the separation colors for four-color printing or special colors of the pattern.

7. A method for seamless engraving of a pattern in an electronic engraving machine, comprising the steps of:

with an engraving element connected to an engraving control signal, engraving a sequence of cups arranged in an engraving pattern into a rotating printing cylinder;

generating the engraving control signal from engraving data that represent gradations of the pattern to be engraved and from a periodic raster signal for generating an engraving raster;

engraving the pattern such that a seam at which an upper edge and a lower edge of the pattern meet at a circumference of the printing cylinder is almost invisible; and for evaluating the seam of the engraved pattern, producing a color proof of at least one separation color of the pattern from the engraving data in that the engraved pattern is offset in a circumferential direction of the printing cylinder so that the seam lies within a visible area of the color proof.

8. A proofing unit for a pattern seamlessly engraved in an electronic engraving machine, comprising:

means for engraving the pattern from engraving data such that a seam at which an upper edge and a lower edge of the pattern meet at a circumference of a printing cylinder is as invisible as possible; and means for evaluating the seam of the engraved pattern by use of a color proof of at least one separation color of the pattern produced from the engraving data, and wherein the engraved pattern is offset in a circumferential direction of the printing cylinder such that the seam lies within a visible area of the color proof.

9. The proofing unit according to claim 8 wherein the proofing unit comprises a color printer for printing the color proof.

10. The proofing unit according to claim 8 wherein the proofing unit comprises a color monitor for displaying the color proof.

11. The proofing unit according to claim 8 further comprising:

a recording data memory wherein the engraving data of the pattern are stored to be read out with addresses;

an address computer connected to the recording data memory for calculating new addresses from the addresses upon consideration of a defined circumferential address offset that corresponds to a desired circumferential position of the seam in the visible area of the color proof;

a color converter connected to the recording data memory that converts the engraving data read out from the recording data memory with the new addresses into control data for available printer colors of a color printer; and the color printer being connected with the control data for printing the color proof.

12. The proofing unit according to claim 8, further comprising:

a recording data memory wherein engraving data of the pattern are stored to be read out with addresses;

an address computer connected to the recording data memory for calculating new addresses from the addresses upon consideration of a defined circumferential address offset that corresponds to a desired circumferential position of the seam in the visible area of the color proof;

a color converter connected to the recording data memory that converts the engraving data read out from the recording data memory with the new addresses into RGB control signals; and a color monitor connected with the RGB control signals for displaying the color proof.

13. An engraving machine for seamless engraving of a pattern, comprising:

a rotationally seated printing cylinder;

an engraving element connected to an engraving control signal and which is axially displaceable along the printing cylinder for planar engraving of a pattern;

the engraving element engraving a sequence of cups arranged in an engraving raster into the printing cylinder engraving line by engraving line;

the engraving control signal is generated from engraving data that represent gradations of the pattern to be engraved and from a periodic raster signal for generating the engraving raster; and the pattern is engraved such that a seam at which an upper edge and a lower edge of the pattern meet at a circumference of the printing cylinder is as invisible as possible;

a proofing unit for evaluating the seam and wherein a color proof of at least one separation color of the pattern is produced from the engraving data, the engraved pattern in the color proof being offset in a circumferential direction of the printing cylinder such that the seam lies within a visible area of the color proof.

14. The engraving machine according to claim 13 wherein the proofing unit comprises a color printer for printing the color proof.

15. The engraving machine according to claim 13 wherein the proofing unit comprises a color monitor for displaying the color proof.

16. A proofing unit, comprising:

a recording data memory wherein engraving data of a pattern are stored to be read out with addresses;

an address computer connected to the recording data memory for calculating new addresses from the addresses upon consideration of a defined circumferential address offset that corresponds to a desired circumferential position of a seam in a visible area of a color proof;

a color converter connected to the recording data memory that converts the engraving data read out from the recording data memory with the new addresses into control data for available printer colors of a color printer; and the color printer being connected with the control data for printing the color proof.

17. A proofing unit, comprising:

a recording data memory wherein engraving data of a pattern are stored to be read out with addresses;

an address computer connected to the recording data memory for calculating new addresses from the addresses upon consideration of a defined circumferential address offset that corresponds to a desired circumferential position of a seam in a visible area of a color proof;

a color converter connected to the recording data memory that converts the engraving data read out from the recording data memory with the new addresses into RGB control signals; and a color monitor connected with the RGB control signals for displaying the color proof.

* * * * *